United States Patent [19]

Shah

[11] Patent Number: 4,878,948

[45] Date of Patent: Nov. 7, 1989

[54] WATER RESISTANCE ADDITIVE FOR CEMENTITIOUS COMPOSITIONS

[75] Inventor: Virendra V. Shah, Macungie, Pa.

[73] Assignee: Air Products and Chemicals, Inc., Allentown, Pa.

[21] Appl. No.: 195,738

[22] Filed: May 18, 1988

[51] Int. Cl.[4] .............................................. C04B 24/08
[52] U.S. Cl. ...................................... 106/90; 106/95; 106/104; 106/111
[58] Field of Search .................... 106/96, 90, 104, 111

[56] References Cited

U.S. PATENT DOCUMENTS 3,537,869 11/1970 Proell ..................................... 106/95
4,434,257 2/1984 Narisawa et al. ...................... 106/95

Primary Examiner—Ferris H. Lander
Assistant Examiner—Anthony J. Green
Attorney, Agent, or Firm—Michael Leach; James C. Simmons; William F. Marsh

[57] ABSTRACT

A cementitious composition comprising cement, aggregate, a water soluble or water dispersible polymer, and a polyethylene glycol ester of a $C_8$–$C_{22}$ fatty acid having an HLB value from about 11 to 20 as a water resistance additive.

10 Claims, No Drawings

WATER RESISTANCE ADDITIVE FOR CEMENTITIOUS COMPOSITIONS

TECHNICAL FIELD

The present invention relates to a cementitious composition, and more particularly, to a cementitious composition having improved water resistance.

BACKGROUND OF THE INVENTION

A cementitious composition gains maximum mechanical performance properties such as compressive, flexural and tensile strengths after about 28 days cure. Cementitious compositions made with low water/cement ratio will have good water resistance if they are properly placed and cured. Cementitious compositions for mortar applications, which have high water/cement ratio and are used in thin applications, suffer from a loss of strength and adhesion characteristics when exposed to water permeation/absorption.

It is known in the art that the water absorption or waterproofing properties of a cementitious composition can be affected by incorporating additives such as paraffin, pozzolanic materials and metal salts of fatty acids absorbed on inert filler. These additives are also referred to as damp proofing or permeability reducing agents. Such commercial water resistance additives provide only marginal improvement in water resistance while adversely affecting the strength development properties. Their use in cementitious compositions increases mixing water demands which results in a decrease in mechanical performance properties such as compressive, tensile and flexural strengths. Some water repellent additives work well in reducing water absorption, but they retard the cement hydration reaction and also migrate to the exposed surface of the mortar. In such cases, the finishing coating of synthetic emulsion displays poor adhesion to the mortar surface.

U.S. Pat. No. 4,434,257 discloses a cement composition having improved crack resistance and water resistance which comprises a mixture of a conventional cement composition with an ethylene-vinyl acetate copolymer emulsion containing 1-10 parts by weight of a polyvinyl alcohol and 0.1-10 parts by weight of a higher fatty acid ester of a polyvalent alcohol having an HLB of 10 or less per 100 parts by weight of the solid resin components of the emulsion. It is stated that when the ester has an HLB of more than 10, the desired improvement of properties of the product cannot be achieved. Preparation 18 which uses a polyoxyethylene sorbitan trioleate with an HLB of 11 is shown in Table I to provide inferior water resistance compared to the preparations according to the invention.

U.S. Pat. No. 3,537,869 discloses additives for cementitious mixtures capable of increasing the compressive strength of the hardened product by 25 to 125%, the additives being various partial fatty acid esters.

SUMMARY OF THE INVENTION

The present invention relates to improving the water resistance of cementitious compositions, particularly those used for applications such as, for example, exterior patching, wall coating and tile mortars. Such compositions typically comprise a hydraulic cement, aggregate (filler), water soluble or water dispersible polymer and a water resistance additive. The water resistance additive, according to the present invention, is a polyethylene glycol ester of a $C_8$–$C_{22}$ fatty acid having an HLB value from about 11–20 in an amount ranging from 0.5–3 wt%, based on cement.

The incorporation of the additive, according to the present invention, in a conventional cementitious composition provides for significantly improving the water resistance during the early curing process. Such cementitious compositions of the invention can be used for basement waterproofing, interior and exterior patching compounds, exterior wall coating and tile mortars.

Further advantages of cementitious compositions containing such polyethylene glycol fatty acid esters include low air entrainment and high wet tensile strength.

DETAILED DESCRIPTION OF THE INVENTION

As the waterproofing additive, the cementitious composition contains 0.5–3 wt% and preferably about 0.8 to 1.2 wt%, based on cement, of a polyethylene glycol ester of a $C_8$–$C_{22}$ fatty acid, which ester has an HLB value from about 11–20, preferably about 11 to 15. [Polyethylene glycols are also known as poly(ethyleneoxy) ethanols]. The fatty acid moiety of the ester may be saturated in that it comprises long hydrocarbon chains containing no carbon-carbon double bonds or it may be an unsaturated fatty acid containing one or more carbon-carbon multiple bonds. Among the fatty acids that are suitable for making the derivatives useful in the invention, there may be included caprylic, capric, myristic, palmitic, stearic, oleic, linoleic and linolenic acids, with the preferred being stearic acid.

The degree of ethoxylation of the fatty acid ester additives would be that which is sufficient to provide the additive with an HLB value ranging from about 11 to about 20 and with regard to the preferred stearic ester would entail about 4–400, preferably about 8–100 ethylene oxide units. The ethoxylated esters can be prepared by methods well known in the art involving the reaction of ethylene oxide with the fatty acid or can be purchased commercially.

Examples of suitable hydraulic cements for use in the composition are, in general, all the commercially available hydraulic cements including the various Portland cements, the white cements, the natural cements, pozzolanic cements (including cements derived from industrial slags), alumina cements and even hydraulic limes and similar materials.

Various types of fine and coarse aggregates are typically used. The type of aggregate used depends on the intended use of the product. For masonry compositions or plasters, it is often advantageous to incorporate sand in the mixture. Such sand may be almost any type of sand having a small particle size, preferably one having a diameter of 1 mm or less. Where the product is subject to more exacting requirements, as for example, the case of a cement patch applied to an existing concrete floor, graded sands of medium particle size such as "Ottawa" sand and "Best" sand or a mixture of the two may be preferred. It will be understood that is is possible to use other aggregates including ground glass, emery powder, ground slag or fine gravel. In concrete mixes, it is often desirable to employ coarse aggregate, such as crushed trap rock.

The ratio of aggregate to cement can range from 4:1 to 1:4. When the cementitious composition of this invention employs sand or a fine aggregate, the ratio of the sand or fine aggregate to the cement is preferably from 2:1 to 1:2. When the concrete mix is prepared for making a floor and employs a mixture of sand, cement and coarse aggregate, the preferred ratio of sand to cement is from 1:1.8 to 1:2.5 and best results are usually obtained when such ratio is about 1:2.

It is usually desirable to incorporate in the cementitious composition, various additives in addition to the water resistance additive. Among the additives typically used in the art are protective colloids, anti-foaming agents, water reducing agents, water soluble polymers and water dispersible polymers. Suitable protective colloids include carboxymethyl cellulose, sodium polyacrylate and ammonium caseinate. Suitable anti-foaming agents include long chain alcohols, such as dry wax, lauryl alcohol, stearyl alcohol and various silicones. The water reducing agent or cement dispersing agent may be purified sodium lignin sulfonate or salts of hydroxylated carboxylic acids. Suitable water soluble polymers would include cellulosic ethers, polyvinyl alcohol, starch and poly(ethylene oxides). Illustrative of water dispersible polymers are aqueous emulsions of acrylate and vinyl ester polymers such as polyacrylic acid, polyvinyl acetate and copolymers of vinyl acetate with acrylates and/or ethylene. These polymers may be added as the emulsion or, in the case of vinyl acetate copolymers, as spray dried powders.

A typical cementitious composition would comprise in parts by weight:

| | |
|---|---|
| cement | 100 |
| aggregate | 25–400 |
| water resistance additive | 0.5–3 |
| water soluble polymer | 0.25–3 |
| or | |
| water dispersible polymer | 5–15 |

A substantial amount of water must be employed in the cementitious composition in order to hydrate the cement and to provide a consistency suitable for working or spreading of the material.

When added to a water soluble polymer or polymer emulsion modified cementitious composition, the additive according to the invention significantly improves the water resistance during the early curing process.

In the following Examples the amounts of the ingredients are in parts by weight.

EXAMPLE 1

This Example shows the effect of a polyethylene glycol ester of stearic acid on the water resistance of a water soluble polymer modified cementitious composition. Table I shows the amount and type of cement, sand, water and water resistance additive in the mortar compositions of Runs 1–4. The hardened mortar films were tested for % water absorption by casting ⅛" to ¼" thickness cement mixture films and curing for a week. The cement films were weighed, soaked in water for ½ hour, 1 hour or 24 hours then reweighed. The results are reported as % water absorption.

The tensile strength test was conducted according to a modified ASTM C190 test method. Water penetration results were reported by measuring the approximate depth of the water soaked into dogbone-shaped briquettes. The test specimens were air-cured for 8 days. Wet tensile strength data was measured after soaking the tensile briquettes in water for one day.

TABLE I

| | RUN | | | |
|---|---|---|---|---|
| | 1 | 2 | 3 | 4 |
| Portland Type-I Cement | 300 | 300 | 300 | 300 |
| ASTM C109 Sand | 600 | 600 | 600 | 600 |
| Lipopeg 4S (25% Solution)[a] | — | 12 | — | — |
| Lipopeg 100S (25% Solution)[b] | — | — | 12 | — |
| Calcium Stearate F2 | — | — | — | 3 |
| VINOL 523S Polyvinyl alcohol | 3 | 3 | 3 | 3 |
| Water | 125 | 116 | 116 | 125 |
| Water/Cement | ← 0.42 → | | | |
| Wet Density - g/cc | 1.86 | 2.04 | 2.17 | 2.06 |
| Flow (Consistency) - CM | 15 | 14.5 | 13.0 | 7.5 |
| % Water Absorption for Hardened Mortar | | | | |
| One Hour | 10.7 | 3.8 | 7.2 | 8.5 |
| 24 Hours | 13.6 | 5.6 | 7.6 | 8.6 |
| Tensile Strength - PSI | | | | |
| 8 day dry cure | 456 | 548 | 557 | 588 |
| 8 days dry + 1 day water soak | 254 | 465 | 489 | 252 |
| % Strength Retention after 24 hours H$_2$O Soak | 56 | 85 | 87 | 43 |
| Approximate Water Penetration After 24 hours | Complete | <1/16" | ⅛" | ¼" |

[a]8 mole polyethylene glycol ester of stearic acid (HLB = 11.2) sold by Lipo Chemicals, Inc.
[b]100 mole polyethylene glycol ester of stearic acid (HLB = 18.8) sold by Lipo Chemicals, Inc.

It can be seen from the data in Table I that the addition of a polyethylene glycol ester of stearic acid (Runs 2 and 3) significantly lowered the percent of water absorbed by the hardened mortar film as measured after one hour and 24 hours and the tensile strength after one day water soak was significantly superior to that of Runs 1 and 4.

EXAMPLE 2

This Example shows the water absorption effect of polyethylene glycol ester of stearic acid on a water dispersible polymer modified cementitious composition. It can be seen from Table II that the use of the water resistance additive according to the invention in Runs 6–8 resulted in reduced water absorption of the hardened mortar after 30 minute and 7 hour water soak. The polyethylene glycol ester of stearic acid having an HLB of 11.2 was especially effective as a water resistance additive.

TABLE II

| | RUN | | | | |
|---|---|---|---|---|---|
| | 5 | 6 | 7 | 8 | 9 |
| Portland Cement Type I | 300 | 300 | 300 | 300 | 300 |
| ASTM C-109 Sand | 600 | 600 | 600 | 600 | 600 |
| Vinac ® XX210 Emulsion[a] | 55 | 54 | 55 | 54 | 55 |
| Lipopeg 4S (50% solution) | — | 6 | — | — | — |
| Lipopeg 39S (40% solution)[b] | — | — | 7.5 | — | — |
| Lipopeg 100S (50% solution) | — | — | — | 6 | — |
| Calcium Stearate F2 | — | — | — | — | 3 |
| Water | 100 | 97.5 | 95.5 | 97.5 | 100 |
| Water/Cement | ← 0.42 → | | | | |
| Wet Density - g/cc | 1.92 | 1.92 | 2.12 | 2.07 | 1.82 |
| % Water Absorption for Hardened Mortar | | | | | |
| ½ Hour Water Soak | 6.5 | 2.9 | 5.9 | 5.2 | 6.8 |
| 7 Hour Water Soak | 7.2 | 3.6 | 6.8 | 6.5 | 7.7 |

[a]Polyvinyl acetate emulsion marketed by Air Products and Chemicals, Inc.
[b]40 mole polyethylene glycol ester of stearic acid (HLB = 16.9) sold by Lipo Chemicals, Inc.

EXAMPLE 3

This Example demonstrates the effect of a polyethylene glycol ester of stearic acid on a cementitious composition containing a water redispersible copolymer powder.

TABLE III

|  | RUN | | | | |
| --- | --- | --- | --- | --- | --- |
|  | 10 | 11 | 12 | 13 | 14 |
| Portland Cement Type-I | 300 | 300 | 300 | 300 | 300 |
| ASTM C109 Sand | 600 | 600 | 600 | 600 | 600 |
| Airflex RP226[a] | 30 | 30 | 30 | 30 | 30 |
| Lipopeg 100S (100%) | — | 3 | — | — | — |
| Lipomulse 165[b] (100%) | — | — | 3 | — | — |
| Calcium Stearate F2 | — | — | — | 3 | — |
| Zinc Stearate | — | — | — | — | 3 |
| Water | ← 125 → | | | | |
| Wet Density g/cc | 1.91 | 2.03 | 1.95 | 1.82 | 1.90 |
| Flow (Consistency)-Cm | 15.5 | 16 | 16.5 | 14.5 | 16.0 |
| Tensile Strength - PSI | | | | | |
| 8 day dry cure | 651 | 702 | 640 | 595 | 584 |
| 8 day dry + 1 day-water soak | 307 | 434 | 413 | 320 | 277 |
| % Strength Retention after water soak | 47 | 62 | 64 | 54 | 47 |
| Approximate water penetration | ⅛" | ⅛" | 3/16" | ⅜" | ⅜" |

[a]Redispersible vinyl acetate-ethylene copolymer powder marketed by Air Products and Chemicals, Inc.
[b]Glyceryl monostearate and Lipopeg 100S blend (HLB = 11) marketed by Lipo Chemicals The data in Table III shows that Runs 11 and 12 containing surfactants with HLB values of 18.8 and 11, respectively, gave superior water resistance as measured by % strength retention after water soak and water penetration.

EXAMPLE 4

This Example compares the use of Lipopeg polyethylene glycol stearate esters with Igepal nonylphenoxy polethylene glycols of similar HLB values. The four surfactants tested were:

| Surfactant | HLB Value |
| --- | --- |
| Lipopeg 39S | 16 |
| Lipopeg 100S | 18.8 |
| Igepal CO-730[a] | 15 |
| Igepal CO-887 (70% solid) | 17.2 |

[a]Igepal surfactants are sold by GAF Corp.

The cementitious compositions were hand mixed because the Igepal surfactants entrain excessive air when mixed in Hobart-type mixing equipment.

TABLE IV

|  | RUN | | | |
| --- | --- | --- | --- | --- |
|  | 15 | 16 | 17 | 18 |
| Portland Cement Type I | 300 | 300 | 300 | 300 |
| ASTM C-109 Sand | 600 | 600 | 600 | 600 |
| Vinol 523S polyvinyl alcohol | 6 | 6 | 6 | 6 |
| Lipopeg 39S (100%) | 6 | — | — | — |
| Lipopeg 100S (100%) | — | 6 | — | — |
| Igepal CO-730 (100%) | — | — | 6 | — |
| Igepal CO-887 (70% solid) | — | — | — | 8.7 |
| Nopco PD-1 | 2.0 | 2.0 | 2.0 | 2.0 |
| Water | ← 150 → | | | |
| Wet Density - g/cc | 2.13 | 2.12 | 2.05 | 2.11 |
| Tensile Strength - PSI | | | | |
| 8 day dry cure | 645 | 610 | 538 | 576 |
| 8 day dry + 1 day water soak | 423 | 478 | 335 | 356 |
| % Strength retention | 66 | 78 | 62 | 62 |
| Approximate Water Penetration | ¼" | ⅛" | ⅜" | ⅜" |

The results in Table IV show the superior tensile strength before and after water soak as well as resistance to water penetration for the cementitious compositions of Runs 15 and 16.

EXAMPLE 5

In this Example the four surfactants used in Example IV were tested for water absorption characteristics in a cementitious composition containing a water redispersible copolymer.

TABLE V

|  | RUN | | | |
| --- | --- | --- | --- | --- |
|  | 19 | 20 | 21 | 22 |
| Portland Cement Type I | 300 | 300 | 300 | 300 |
| ASTM C-109 Sand | 600 | 600 | 600 | 600 |
| Lipopeg 39S (50% Soln.) | 6 | — | — | — |
| Lipopeg 100S (50% Soln.) | — | 6 | — | — |
| Igepal CO-730 (100%) | — | — | 6 | — |
| Igepal CO-887 (70% solid) | — | — | — | 8.7 |
| Airflex RP226 | 22.5 | 22.5 | 22.5 | 22.5 |
| Nopco PD-1 | 2.1 | 2.1 | 2.1 | 2.1 |
| Water | ← 150 → | | | |
| Wet Density - g/cc | 2.10 | 2.10 | 2.0 | 2.0 |
| % Water Absorption after 7 day dry cure + 1 day water soak | 3.3 | 3.2 | 4.5 | 4.3 |
| % Water Absorption after 7 day dry cure + 1 day water soak + 2 day dry + 1 day water soak | 3.5 | 3.3 | 4.6 | 4.5 |

Again the data in Table V shows that the compositions containing the Lipopeg surfactants according to the invention demonstrated superior water resistance.

The general practice in the industry for improving water resistance is by the incorporation of the salt of a fatty acid (absorbed on inert filler) into the cementitious composition. This additive increases mixing water demand resulting in reduced strength for the hardened mortar.

The additives according to the present invention are water dispersible and are compatible with water soluble and water dispersible polymers. These additives do not increase the mixing water demand. Due to their better compatibility with water soluble polymers and the salt of fatty acids, these additives coat the cement grain efficiently and also fill out the pores in the hardened concrete which results in reduced capillary flow of the water. Since these additives are well dispersed in the cement matrix, they do not exhibit a tendency to migrate to the exposed surface and the exterior coating of a pair or textures over such exposed surface will have good adhesion. Moreover, the additives according to the present invention also entrain less air than the salt of fatty acids and wax emulsions.

STATEMENT OF INDUSTRIAL APPLICATION

The present invention provides an additive for improving the water resistance of cementitious compositions.

I claim:

1. In a cementitious composition comprising cement, aggregate, water soluble or water dispersible polymer and a water resistant additive, the improvement which comprises about 0.5 to 3 wt%, based on cement, of a polyethylene glycol ester of a $C_8$–$C_{22}$ fatty acid having an HLB value from 11 to 20 as the water resistant additive.

2. The composition of claim 1 in which the ester has an HLB value of 11 to 15.

3. The composition of claim 1 in which the ester is 0.8 to 1.2 wt% of the cement.

4. The composition of claim 1 in which the fatty acid is stearic acid.

5. The composition of claim 4 in which the ester contains about 8 to 100 moles of polymerized ethylene oxide.

6. The composition of claim 5 in which the HLB value of the ester is 11.

7. The composition of claim 5 in which the HLB value of the ester is about 16.

8. The composition of claim 5 in which the HLB value of the ester is about 19.

9. In a cementitious composition comprising (in parts by weight)

| cement | 100 |
| aggregate | 25-400 |
| water resistance additive | 0.5-3 |
| water soluble polymer | 0.25-3 | the improvement which comprises a polyethylene glycol ester of stearic acid having an HLB value from 11 to 20 as the water resistance additive.

10. In a cementitious composition comprising (in parts by weight)

| cement | 100 |
| aggregate | 25-400 |
| water resistance additive | 0.5-3 |
| water dispersible polymer | 5-15 | the improvement which comprises a polethylene glycol ester of stearic acid having an HLB value from 11 to 20 as the water resistance additive.

* * * * *